(12) United States Patent
Kraan

(10) Patent No.: US 7,077,053 B2
(45) Date of Patent: Jul. 18, 2006

(54) APPARATUS FOR PREPARING COFFEE

(75) Inventor: Diederik Kraan, Apeldoorn (NL)

(73) Assignee: Sara Lee/DE N.V., Utrecht (NL)

( * ) Notice: Subject to any disclaimer, the term of this patent is extended or adjusted under 35 U.S.C. 154(b) by 194 days.

(21) Appl. No.: 10/868,107

(22) Filed: Jun. 15, 2004

(65) Prior Publication Data
US 2004/0231523 A1 Nov. 25, 2004

Related U.S. Application Data

(62) Division of application No. 10/049,734, filed as application No. PCT/NL00/00556 on Aug. 8, 2000, now Pat. No. 6,748,850.

(30) Foreign Application Priority Data
Aug. 17, 1999 (NL) .................................. 1012847

(51) Int. Cl.
*A47J 31/40* (2006.01)
*A47J 31/06* (2006.01)
(52) U.S. Cl. .................... 99/295; 99/302 R; 99/307
(58) Field of Classification Search ............... 99/295, 99/302 R, 307, 306, 315
See application file for complete search history.

(56) References Cited

U.S. PATENT DOCUMENTS 5,921,168 A * 7/1999 Nello ........................ 99/295
6,009,792 A * 1/2000 Kraan ........................ 99/295

FOREIGN PATENT DOCUMENTS

| EP | 094718 | 3/1991 |
|---|---|---|
| WO | 9402059 | 2/1994 |
| WO | 9517121 | 6/1995 |

* cited by examiner

*Primary Examiner*—Reginald L. Alexander
(74) *Attorney, Agent, or Firm*—Altera Law Group, LLC

(57) ABSTRACT

The apparatus for preparing coffee comprises a holder arranged for receiving a pouch made of filter material and filled with a product to be extracted. The holder comprises at least one overflow opening and one access opening for placing the pouch in the holder. The apparatus further comprises a cover for closing and releasing the access opening and clamping means for pressing the holder and the cover towards each other when the cover closes of the access opening of the holder.

19 Claims, 7 Drawing Sheets

APPARATUS FOR PREPARING COFFEE

CROSS-REFERENCE TO RELATED APPLICATIONS

This application is a divisional of application Ser. No. 10/049,734 filed on May 31, 2002 and now issuing as U.S. Pat. No. 6,748,850 on Jun. 15, 2004, which is a national stage entry of PCT/NL00/00556 filed Aug. 8, 2000, the complete subject matter of which is hereby incorporated herein by reference in its entirety.

The invention relates to an apparatus for preparing coffee, comprising a holder arranged for receiving a pouch made of filter material and filled with a product to be extracted, the holder comprising at least one outflow opening and an access opening for placing the pouch in the holder, the apparatus further comprising a cover for closing and releasing the access opening and clamping means for pressing the holder and the cover towards each other when the cover closes off the access opening of the holder wherein the apparatus further comprises a housing wherein the clamping means comprise a rotation element with a first and second opposite ends, the rotation element being connected adjacent its first end to the housing for rotation about a horizontally direct first rotation axis between a first and second rotational position for closing the access opening of the holder in the second rotational position by means of the cover and releasing the access opening in the first rotational position.

Such an apparatus is known from the international patent application WO 84/02069. In this, the known apparatus, as shown in FIG. 11 of this publication, the cover and the rotation element are integrated in one another. Furthermore the known apparatus comprises a closing arrangement for pressing the integrated rotation element and cover to the holder when the cover closes off the holder. A disadvantage of the known apparatus is that the frequent opening and closing of the holder reduces the reliability of the liquid seal between the cover and the holder. When in use, under high pressure, hot water is supplied to the holder for preparing coffee, it may therefore happen that water leaks from the holder. This is caused by improper closure of the cover and the holder. If water leaks out, even if only to a slight extent, the pressure in the holder decreases. When the pressure in the holder decreases, this leads to a deterioration of the quality of the coffee extract obtained. This is the case in particular when the outflow opening has such a small diameter that the coffee extract spouts from the outflow opening for obtaining coffee with a small bubble froth layer (café creème). When the pressure decreases, however, if may happen that the speed at which the coffee extract spouts from the outflow opening is not sufficient for preparing cafécrème.

The object of the invention is to provide an apparatus that provides a solution to the above-stated problem. The construction should then be so reliable that even after the holder has frequently been closed and opened again, still a reliable seal between cover and holder can be obtained.

To that end, the apparatus according to the invention is characterized in that the rotation element for pressing the cover and the holder towards each other, when the cover closes off the access opening of the holder, engage at least two mutually different engagement positions located on an external surface of the cover, the cover further comprising a connection located on the external surface of the cover, for the supply of water to the holder, the two mutually different engagement positions each not coinciding with the position on the external surface where the connection is located, and the cover being rotatably connected to the rotation element for rotation over a limited angle about an engagement rotation axis, which engagement rotation axis extends along the two mutually different engagement positions.

What is achieved in that the rotation element engage at least two mutually different engagement positions located on an external surface of the cover, if that the engagement positions do not each need to coincide with the position on the external surface where the connection is located, and that, moreover, the cover can be connected to the rotation element for rotation over a limited angle about the engagement rotation axis, the engagement rotation axis extending through the two mutually different engagement positions. The engagement positions can then be used for movably connecting the cover and the rotation element and can moreover be used for pressing the cover and the holder towards each other, when the cover is to close off the access opening of the holder. Preferably, therefore, the cover is movably connected to the rotation element at the two engagement positions. More in particular, the connection is located approximately in the center of the external surface of the cover. In this manner, at a central position, water can be supplied in the holder. In particular, the connection is also located approximately centrally of the at least two engagement positions. Then, the force exerted by the rotation element on the engagement positions of the cover when the cover closes off the holder can be equivalent to a force exerted by the rotation element on the holder at a position coinciding with the center of the cover, where the connection is preferably located.

This has as a result that a good liquid seal between the cover and the holder is obtained at all times. To that end, in particular, the external surface is of at least substantially circular design.

According to a preferred embodiment of the apparatus, the apparatus further comprising a closing arrangement for detachably connecting the rotation element, adjacent the second end, with the housing when the cover in the second rotational position closes off the access opening, the cover being attached to the rotation element such that in the second rotational position, the rotation axis extends along a first side of the cover and the second end is located on a second side of the cover, located opposite the first side.

According to a first further elaboration of this embodiment, the first rotation axis is located above a flat plane through the access opening of the holder. An advantage of this embodiment is that the housing can have a relatively narrow design. In this connection, the apparatus can be further characterized in that the plane defined by the first rotation axis and the second end and the plane through the opening include an acute angle when the cover closes off the holder in the second rotational position.

In particular, the cover is movably connected to the rotation element, so that the cover, when the holder is being closed, can optimally position itself relative to the holder.

According to a further elaboration, the engagement rotation axis runs at least substantially parallel to the first rotation axis. When during closure of the cover a part of the edge of the cover initially engages the holder, it is possible, upon further rotation of the rotation element about the first rotation axis, for the cover to simultaneously rotate through a limited angle about the engagement rotation axis. This ensures that the cover is positioned optimally relative to the holder, that is, the cover is positioned such that is seals the holder liquid tightly. To guarantee, when closing the holder, that the cover and the holder initially engage each other at one point only, the apparatus preferably further comprises spring means which exert such a force on the cover that an underside of the cover comes to lie approximately parallel to the plane defined by the fist rotation axis and the second end by rotation of the rotation element about the engagement rotation axis when the cover is lifted off the holder by rotation of the rotation element about the first rotation axis.

According to a highly advantageous embodiment, the spring means comprise a flexible hose which is attached to the cover for supplying hot water to the holder. The flexible hose then has a double function.

The invention will be further elucidated on the basis of the drawing.

In the drawing:

FIG. 5b shows a front view of the apparatus of FIG. 1 in the condition according to FIG. 5a;

FIG. 6b shows a cross section along the plane A—A of FIG. 6a.

Referring to FIGS. 1–5b, presently a first embodiment of an apparatus according to the invention will be discussed.

Figure 6B:
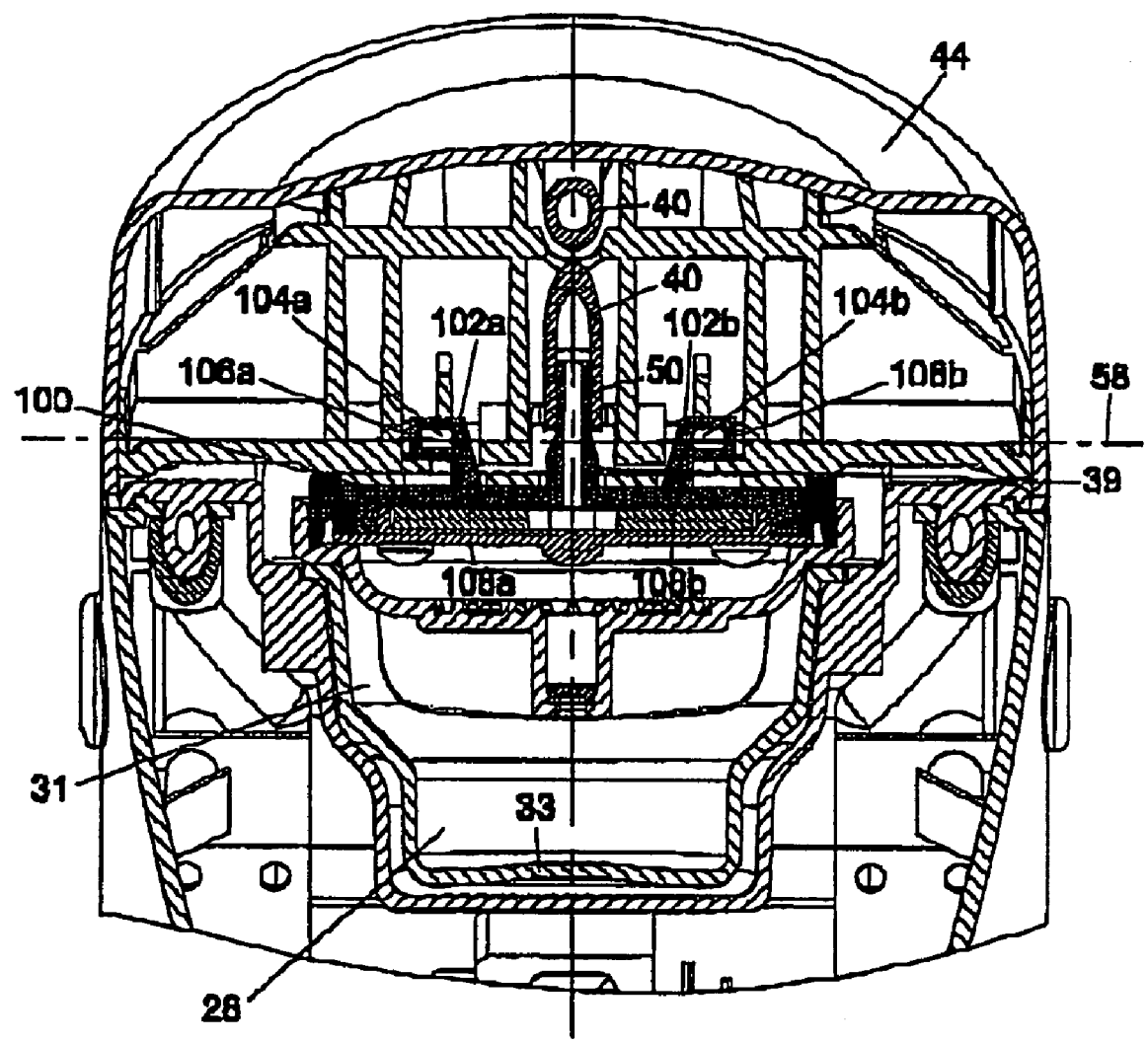
Figure 6A:
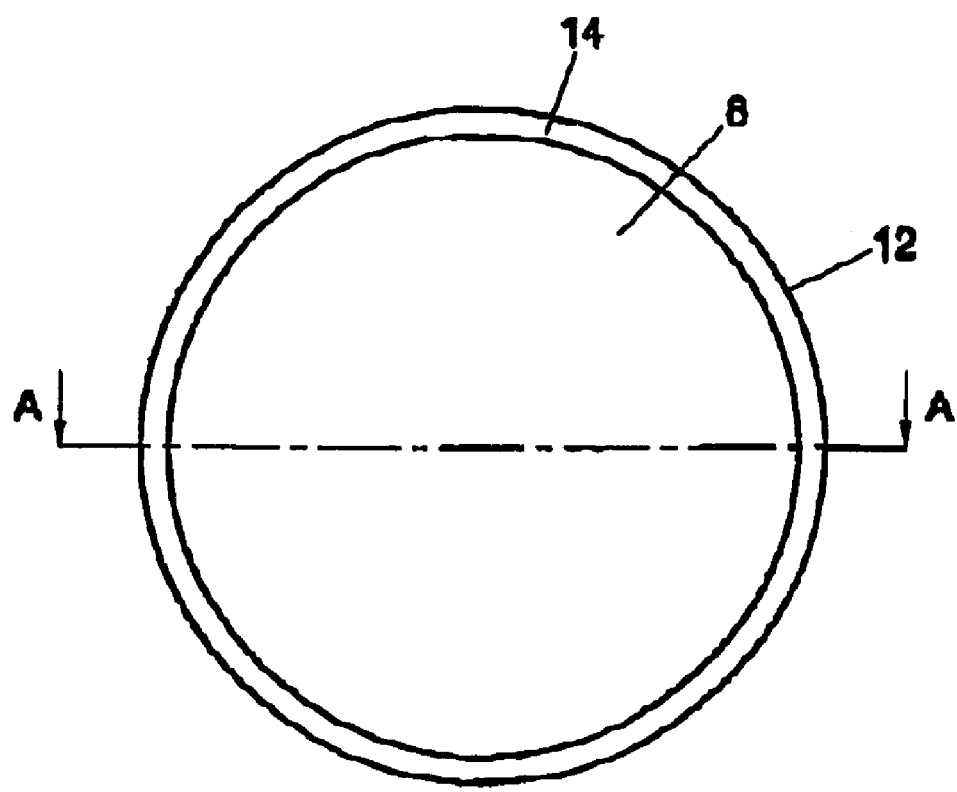
FIG. 6a shows a top plan view of a pouch which can be applied in the apparatus according to FIG. 1.
Figure 6B:
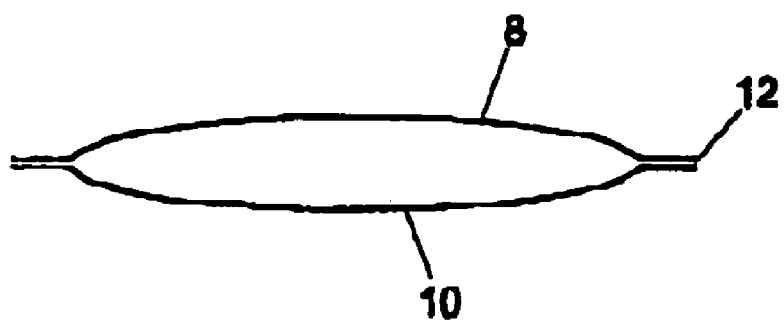

The apparatus 1 the preparing coffee comprises a housing 2, comprising a holder 4 detachably connected to the housing. The holder 4 is arranged for receiving a pouch 6, made of a filter material and filled with a product to be extracted, such as ground coffee, as is shown in FIGS. 6a and 6b.

In this example, the pouch 6 consists of an upper sheet 6 and a lower sheet 10, each made of filtering paper. The upper sheet 8 and the lower sheet 10 are each of disc-shaped design and joined together adjacent their peripheral edges 12. This joint forms a circumferential sealing seam 14, closed in itself. The holder 4 is of cup-shaped design and consists of a bottom 16 and an upright, circumferential side wall 18, connected to the bottom. Provided in the bottom 16 is a recess 20, provided with at least one outflow opening 22. At its upper end, the holder is provided with an access opening 24.

The housing 2 further comprises a liquid receiving space 25 which comprises an outflow opening 26. Present in the liquid receiving space 25 is a collecting reservoir 28 of cup-shaped design (of the type described in Dutch patent application no. 10.06059). In a side wall 81 of the collecting reservoir 28, outflow openings 80 are provided. A bottom 88 of the collecting reservoir is, in top plan view, of substantially spherical design. In this example, the liquid receiving space 25 is formed by a cup-shaped element 32, open at the top, which is so designed at its upper end that the holder 4 can be detachably placed on it.

The apparatus further comprises a cover 34 for closing and releasing the access opening 24 of the holder. At its underside, the cover 84 is fitted with a sealing ring 86, which, in use, can cooperate with the holder 4. At its upper side, the cover comprises a connection comprising an inflow opening 88 and a tubelet which, via a liquid duct 40, is connected to a device 49 for heating hot water. The device 42 is of a type known per se, such as, for instance, a hot water boiler, so that a further explanation on this point can be dispensed with.

The apparatus further comprises a rotation element 44 having a first 46 and second 48 end, located opposite each other. Adjacent its first and 46, the rotation element is connected to the housing 2 for rotation about a horizontally directed first rotation axis 50. The rotation element can rotate about the first rotation axis 50 between a first (see FIG. 5) and a second (see FIG. 1) rotational position. When the rotation element 44 is in the first rotational position, the access opening 24 of the holder 4 is cleared (see FIG. 5a). When, by contrast, the rotation element is in the second rotational position, the holder is closed off, that is, the access opening 24 is closed off by the cover 84 (see FIG. 1).

Figure 1:
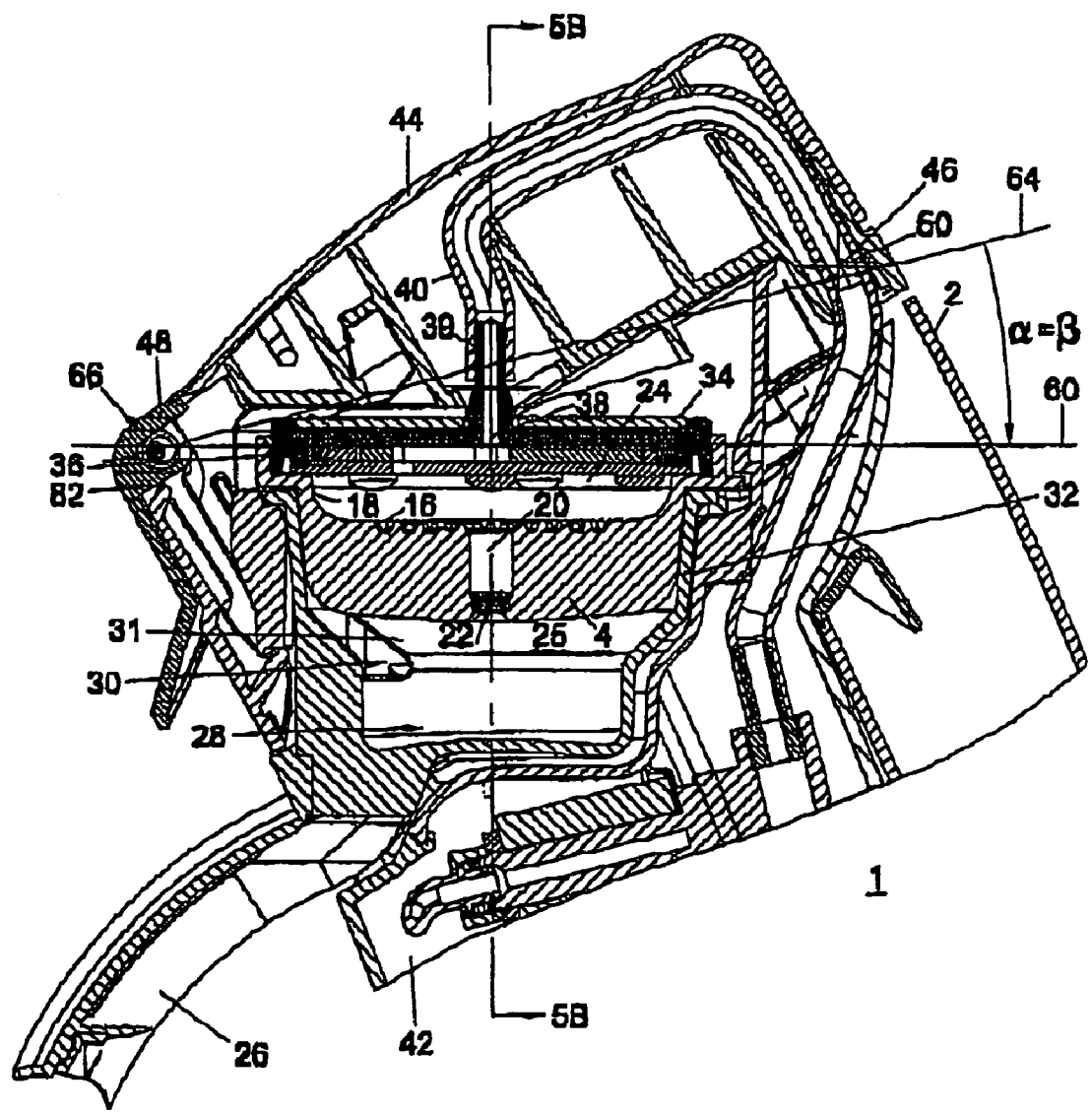
FIG. 1 shows a cross section of a first embodiment of an apparatus according to the invention, in which a holder is closed by a cover.

The apparatus further comprises a closing arrangement 52 for detachably connecting the rotation element to the housing 2 adjacent the second end 48 of the rotation element 44 when the cover 84 closes off the access opening 84 in the second rotational position (see FIG. 1).

Figure 2:
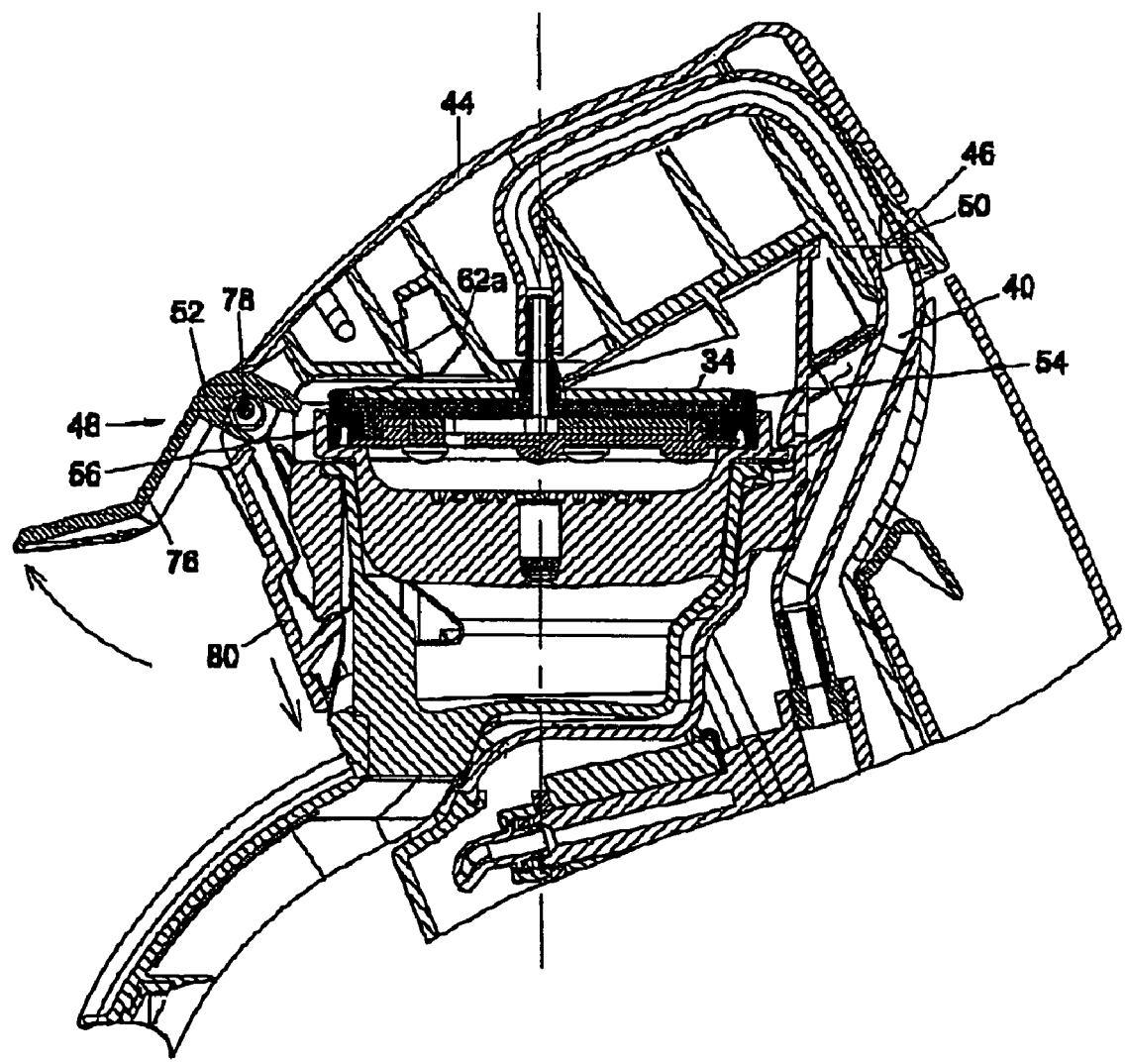
FIG. 2 shows a cross section of the apparatus according to FIG. 1 upon a first step towards opening the holder.

As can be properly seen in FIG. 1, the cover 84 is attached to the rotation element 44 such that in the second rotational position the rotation axis 50 extends along a first side 54 of the cover and the second end 48 is located at a second side 56 of the cover, located opposite the first side (see FIG. 2).

The cover 34 is movably connected to the rotation element 44. As can be properly seen in FIG. 5b, the cover 84 is connected, at the upper side of its outside surface, to two raised arms 102a and 102b, extending upwards and each comprising an opening 104a, 104b, respectively. Extending through each of the openings 104a and 104b is an arm 106a, 106b of the rotation element 44. These arms are much thinner than the openings 104a and 104b. This has as a results that the cover is movably connected to the rotation element 44. Furthermore, the cover is connected to the rotation element 44 for rotation over a limited angle about an engagement rotation axis 58.

The raised arms 102a, 102b extend upwards from positions on the external surface 100, which positions will be designated hereinbelow as two mutually different engagement positions 108a, 108b. Accordingly, these engagement positions are located at the bottom of the raised arms 102a and 102b. From the drawing, it is clear that the connection 89 for the supply of water to the holder is located at such a position that the two mutually different engagement positions do not each coincide with the position on the external surface where the connection 89 is located. Furthermore, the cover is then connected to the clamping means for rotation over a limited angle about the engagement rotation axis 58, that is, connected to the clamping element 44, comprising the arms 106a, 106b and the raised arms 102a, 102b, the engagement rotation axis 58 extending along, that is, in the proximity of the two mutually different engagement positions. As the openings 104a and 104b are larger than a cross section of the arms 106a and 106b, this means that the cover 34, in addition to being rotatable about the engagement axis 58, is also connected to the rotation element 44 so as to be translatable over a certain distance. Accordingly, the cover is movably connected to the rotation element at the two engagement positions 108a and 108b. The connection 89 is located approximately in the center between the engagement positions 108a and 108b. Furthermore, the connection 89 is located approximately in the center of the external surface of the cover 84. In this example, the external surface of the cover 84 is of circular design. Also, in this example, a line through the at least two engagement positions 108a and 108b is approximately parallel to the first rotation axis 50. This line approximately coincides with the engagement rotation axis 58.

Characteristic of the embodiment according to FIGS. 1–5b is that the first rotation axis 50 is located above a flat plane 60 through the access opening 24 of the holder 4 (FIG. 1). The first rotation axis is parallel to this plane 60. Further, the engagement rotation axis 58 runs at least approximately parallel to the first rotation axis 50. Thus, the cover is connected to the rotation element 44 for rotation about the engagement rotation axis through a limited angle of rotation.

As can be properly seen in FIG. 1, the plane 64 defined by the first rotation axis 50 and the second end 48, and the plane 60 through the access opening 24 include an acute angle α when the cover closes off the holder in the second rotational position. An intersecting line 68 of the two last-mentioned planes is located adjacent the second end 48.

Figure 5A:
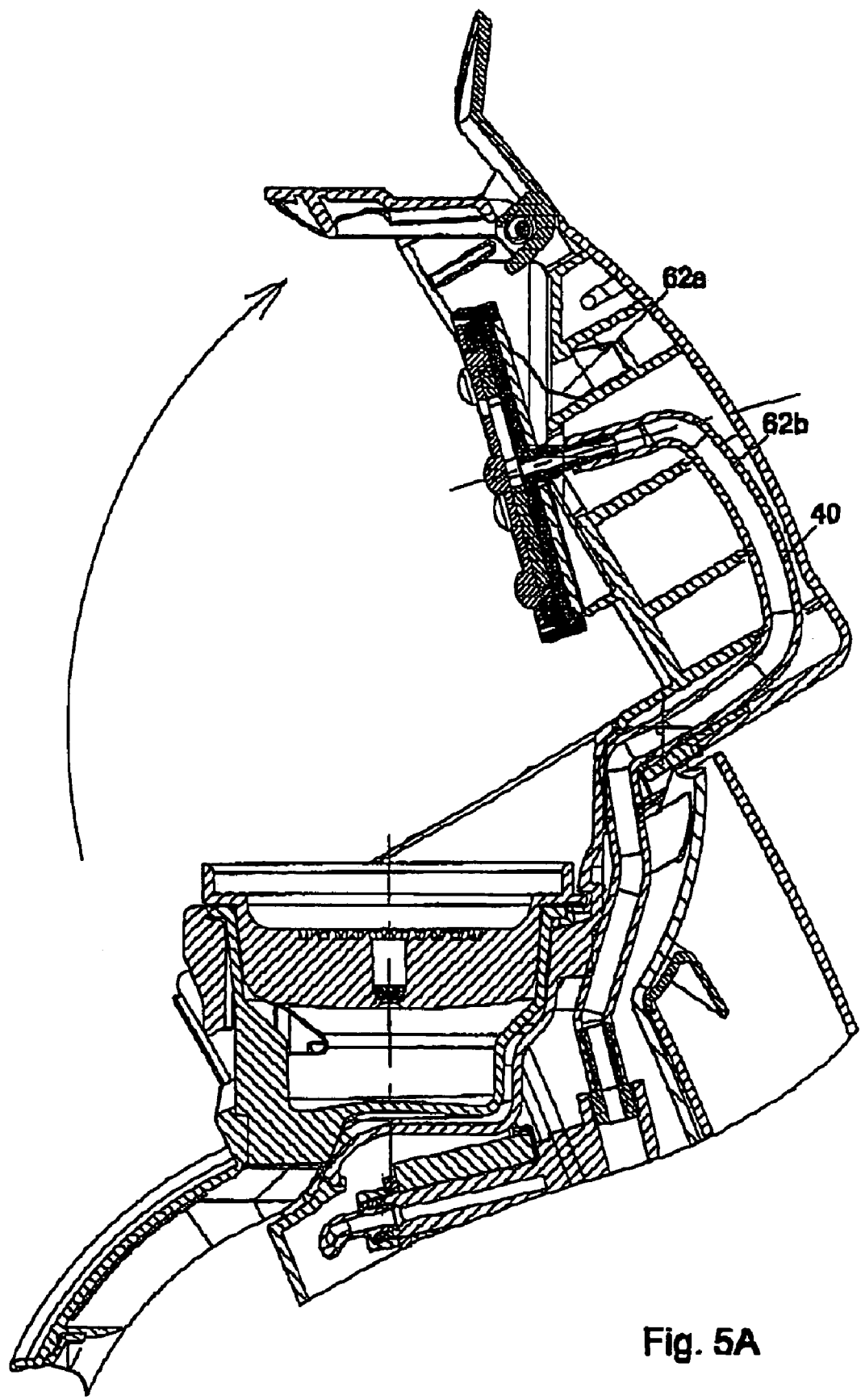
FIG. 5a shows a cross section of the apparatus according to FIG. 1 upon a fourth and final step towards opening the holder.

The apparatus further comprises spring means 62a and 62b, which exert such a force on the cover 84 that the cover rotates about the engagement rotation axis 58 in a direction such that angle α is reduced when the cover is lifted off the holder by rotation of the rotation element 44 about the first rotation axis 50 (see also FIG. 5a). In this example, the spring means 62b comprise inter alia the flexible duct 40.

The apparatus further comprises clamping means for pressing the holder and the cover towards each other when the cover closes off the access opening of the holder.

When the cover is in the second position, the clamping means engage the outer surface 100 of the cover at at least two mutually different engagement positions 108a and 108b. In this example, the clamping means comprise the rotation element 44 with the arms 106a, 106b, and the raised arms 102a, 102b.

The operation of the apparatus is as follows. First, the closing arrangement 52 is operated so that the cover 34 can be lifted off the holder 4 by means of rotation of the rotation element 44 about the first rotation axis 50. The resultant situation is shown in FIG. 5a. Then the pouch 6, as shown in FIGS. 6a and 6b, is placed in the holder 4. To that end, the holder 4 can be removed from the housing 2, whereafter the holder 4, together with the pouch 6, is replaced in the housing 2. Then, the cover can be closed by moving the first end 46 of the rotation element 44 downwards, the rotation element 44 thereby rotating about the first rotation axis 50. The spring means 62a, 62b provide that such force is exerted on the cover that an underside of the cover comes to lie approximately parallel to the plane defined by the first rotation axis and the second end, by rotation of the rotation element about the engagement rotation axis when the cover is lifted off the holder by rotation of the rotation element about the first rotation axis. This means that, during closure, the second side 56 of the cover first of all contacts the holder 4. At that time, the arms 108a, 108b of the clamping element 44 do not yet press on the arms 102a, 102b of the cover. When, subsequently, the second end 48 is moved further downwards, the first side 54 of the cover will be gradually moved in the direction of the holder 4. In the process, the angle β between the plane 64 and the plane 90 through the underside of the cover 34 will increase from approximately 0 degrees (FIG. 4) to a value of α (in FIG. 1) As a result of this movement, it is provided that the cover 84 is placed symmetrically on the holder 4. This situation is shown in FIG. 8.

Thereupon, the closing arrangement 52 is operated, with the result that the second end 48 of the rotation element 44 is pressed down. As a result, the arms 106a, 106b will press on the arms 102a, 103b in a vertically downwardly directed direction. The result is that the cover 84 is pressed upon at a position which, in effect, is located approximately in the center of the external surface of the cover. The force between the sealing ring 86 on the one hand and the holder 4 on the other hand will then be approximately the same at every point of the sealing ring. The deformation of the sealing ring will therefore by likewise approximately the same at every point of the sealing ring. As a result of this last, in turn, an optimum and reliable seal between cover and holder has been obtained. Then the closing arrangement 52 is further operated (see FIGS. 1 and 2) for locking the rotation element.

Figure 3:
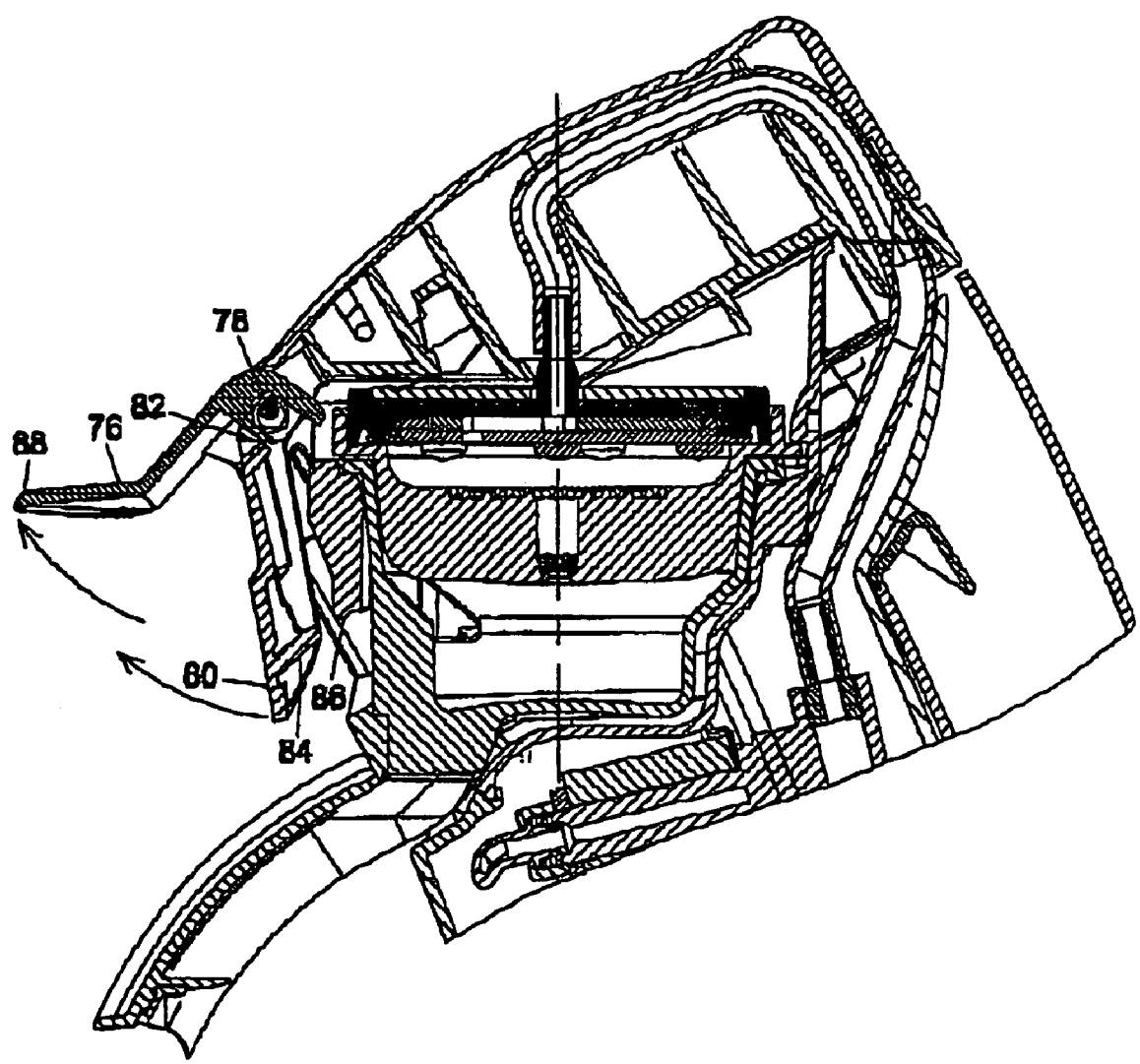
FIG. 3 shows a cross section of the apparatus according to FIG. 1 upon a second step towards opening the holder.
Figure 4:
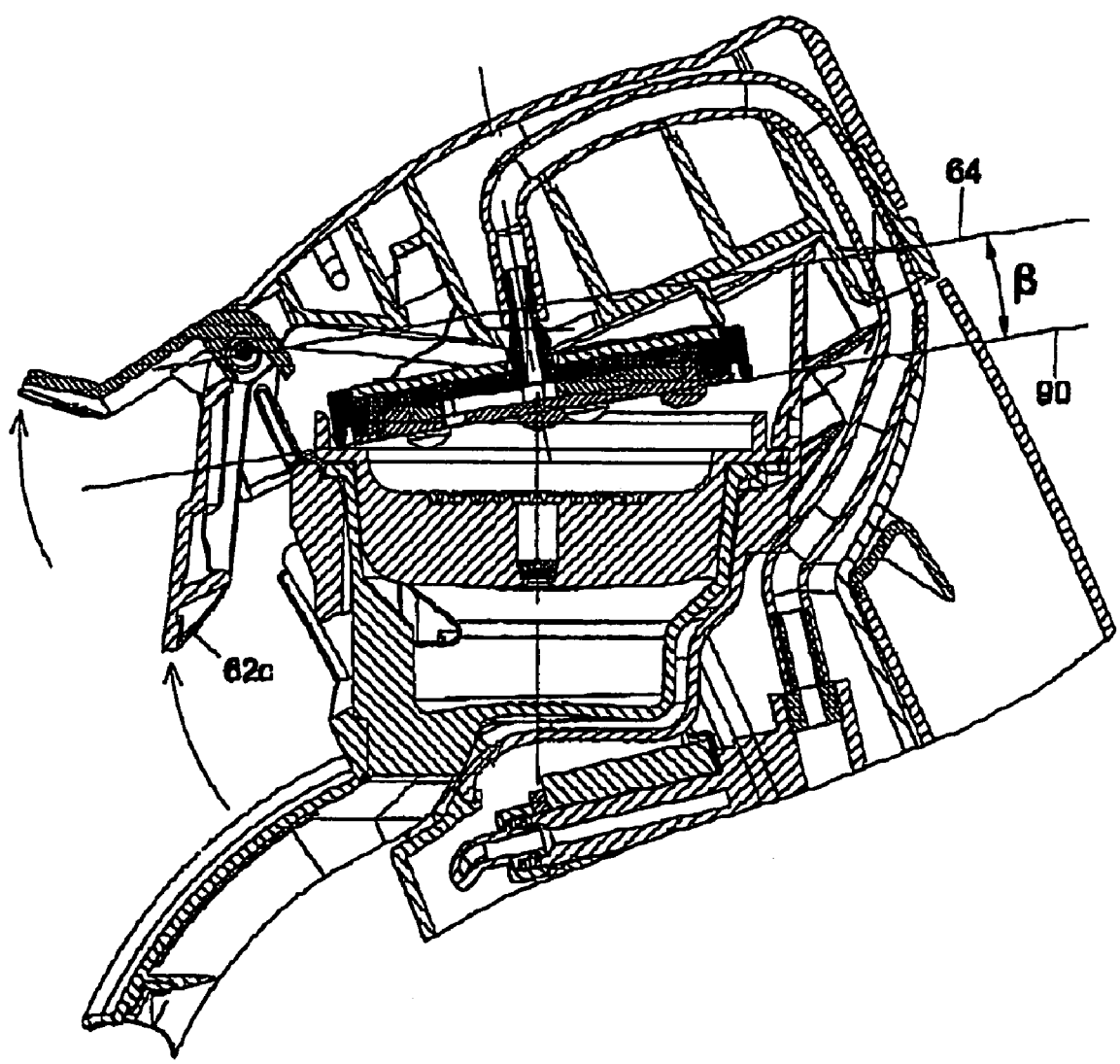
FIG. 4 shows a cross section of the apparatus according to FIG. 1 upon a third step towards opening the holder.

In this example, the closing arrangement 58 is provided with an operating lip 76 which is connected to the rotation element 44 adjacent the second end 48 for rotation about a rotation axis 78. Further, the closing arrangement 52 comprises a closing lip 80 connected to the operating lip 76 for rotation about a rotation axis 82. In the closed position, as is shown in FIG. 1, the rotation axis 82 is located under the rotation axis 78, while further the distance between the rotation axis 78 and the holder 4 is smaller than the distance between the rotation axis 82 and the holder 4. In this example, a free end 84 of the closing lip 80 hooks under a projection 88 of the housing 2. When the closing arrangement 52 is to be opened, a free end 88 of the operating lip 76 is moved upwards, as is shown in FIG. 2. As a result, the free end 84 of the closing lip 80 will move downwards (see FIG. 2), so that the free end 84 can be detached from the projection 86. This situation is shown in FIG. 2. A spring 62c provides that the free end 84 moves in a direction away from the housing 2 and thus becomes automatically detached from the projection 88. This situation is also shown in FIG. 3. Then, the operating lip 76 is moved further upwards (see FIG. 4), whereby the angles α and β are reduced. Then the cover can be opened further, as shown in FIGS. 5a and 5b. For closing the cover, the steps discussed with reference to FIGS. 1–5b are traversed in the opposite direction.

It is noted that the advantage of the closing arrangement 52 described above is that opening and closing the closing arrangement can be performed through a very light operation of the operating lip 76. As a result of the temporary downward movement of the closing lip 80, when the operating lip 76 is moved upwards (see FIG. 2), and the opposite effect of the closing lip 80 moving upwards when the operating lip 76 is moved downwards, a stable situation is achieved in closed condition, as shown in FIG. 1. Furthermore, by moving the operating lip from the position shown in FIG. 2 to the position shown in FIG. 1, the rotation element 44 is rotated counterclockwise about the rotation axis 50, so that the cover 84 is properly pressed onto the holder 4.

In the closed position, as shown in FIG. 1, hot water can subsequently be supplied to the duct 40. This hot water is supplied via the cover 34 to the top of the pouch 6. This hot water passes through the pouch and proceeds to collect as coffee extract in the recess 20. Then the coffee extract spouts through the spout opening 22 into the collecting reservoir 28. The collecting reservoir 23 is thus filled with coffee extract. As the coffee extract spouts into the surface of the liquid in the collecting reservoir 28, a good café crème is formed. This café crème flows via the outflow opening 80 out of the collecting reservoir to leave the housing via the outlet opening 26.

The invention is not in any way limited to the embodiments described hereinbefore. Thus, other embodiments of the closing arrangement 52 are conceivable. Also, the holder and the cover can have other forms than shown. The holder and the cover can have, for instance, a square instead of a circular cross section. Also, it is not necessary to employ a collecting reservoir 28 as shown in the drawing.

Such variants are understood to fall within the scope of the invention.

The invention claimed is:

1. An apparatus for preparing coffee, comprising a holder arranged for receiving a pouch made of filter material and filled with a product to be extracted, the holder comprising at least one outflow opening and an access opening for placing the pouch in the holder, the apparatus further comprising a cover for closing and releasing the access opening and clamping means for pressing the holder and the cover towards each other when the cover closes off the access opening of the holder wherein the apparatus further comprises a housing wherein the clamping means comprise a rotation element with a first and second opposite ends, the rotation element being connected adjacent its first end to the housing for rotation about a horizontally directed first rotation axis between a first and second rotational position for closing the access opening of the holder in the second rotational position by means of the cover and releasing the access opening in the first rotational position, wherein the rotation element for pressing the cover and the holder towards each other, when the cover closes off the access opening of the holder, engage at least two mutually different engagement positions located on an external surface of the cover, the cover further comprising a connection located on the external surface of the cover, for the supply of water to the holder, the two mutually different engagement positions each not coinciding with the position on the external surface where the connection is located, and the cover being rotatably connected to the rotation element for rotation over a limited angle about an engagement rotation axis, which engagement rotation axis extends along the two mutually different engagement positions.

2. An apparatus according to claim 1, wherein the cover is movably connected to the rotation element, adjacent the two engagement positions.

3. An apparatus according to claim 1, wherein the connection is located approximately centrally of the at least two engagement positions.

4. An apparatus according to claim 3, wherein the connection is located approximately in the center of the external surface of the cover.

5. An apparatus according to claim 4, wherein the external surface is of at least substantially circular design.

6. An apparatus according to claim 5, wherein the apparatus further comprising a closing arrangement for detachably connecting the rotation element to the housing adjacent the second end when the cover closes off the access opening in the second rotational position, the cover being connected to the rotation element such that in the second rotational position the rotation axis extends along a first side of the cover and the second and is located on a second side of the cover, located opposite the first side of the cover.

7. An apparatus according to claim 6, wherein a line through the at least two engagement positions is located approximately parallel to the first rotation axis.

8. An apparatus according to claim 6, wherein the first rotation axis is above a flat plane through the access opening of the holder.

9. An apparatus according to claim 8, wherein an underside of the cover is located at least substantially below a plane defined by the first rotation axis and the second end when the cover closes off the holder in the second rotational position.

10. An apparatus according to claim 9, wherein the first rotation axis is parallel to the plane through the opening.

11. An apparatus according to claim 9, wherein the plane defined by the first rotation axis and the second end and the plane through the opening included an acute angle when the cover closes off the holder in the second rotational position.

12. An apparatus according to claim 9, wherein the plane defined by the first rotation axis and the second end and the plane through the opening have an intersecting line located adjacent the second end when the cover closes off the holder in the second rotational position.

13. An apparatus according to claim 12, wherein the second engagement rotation axis is connected to the rotation element, the engagement rotation axis being at least approximately parallel to the first rotation axis.

14. An apparatus according to claim 13, wherein the apparatus further comprises spring means which exert such a force on the cover that an underside of the cover comes to lie approximately parallel to the plane defined by the first rotation axis and the second end by rotation of the rotation element about the second engagement rotation axis when the cover is lifted off the holder by rotation of the rotation element about the first rotation axis.

15. An apparatus according to claim 14, wherein the spring means comprise a flexible hose which is connected to the cover for supplying hot water to the holder.

16. An apparatus according to claim 5, wherein the first rotation axis is located at least approximately in a flat plane through the access opening of the holder.

17. An apparatus according to claim 16, wherein an underside of the cover is located at least substantially in a plane defined by the engagement rotation axis and the second end when the cover closes off the holder.

18. An apparatus according to claim 17, wherein the first rotation axis is parallel to the plane through the access opening.

19. An apparatus according to claim 17, wherein the plane defined by the engagement rotation axis and the second end and the plane through the opening extend at least approximately parallel when the cover closes off the holder in the second rotational position.

* * * * *